US007959277B2

(12) United States Patent
Freitag et al.

(10) Patent No.: US 7,959,277 B2
(45) Date of Patent: Jun. 14, 2011

(54) AIR FILTER FOR USE WITH A LIQUID INK UMBILICAL INTERFACE IN A PRINTER

(75) Inventors: Chad David Freitag, Portland, OR (US); Edward Charles Grenier, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 338 days.

(21) Appl. No.: 12/273,415

(22) Filed: Nov. 18, 2008

(65) Prior Publication Data

US 2010/0123763 A1 May 20, 2010

(51) Int. Cl.
*B41J 2/175* (2006.01)
*B41J 2/19* (2006.01)
*G01D 11/00* (2006.01)

(52) U.S. Cl. ................. 347/88; 347/92; 347/93; 347/99

(58) Field of Classification Search .................... 347/88, 347/99, 84, 85, 92, 93, 95, 22, 23, 25, 34, 347/35

See application file for complete search history.

(56) References Cited

U.S. PATENT DOCUMENTS

| | | | | |
|---|---|---|---|---|
| 5,489,925 | A * | 2/1996 | Brooks et al. | 347/6 |
| 5,732,751 | A | 3/1998 | Schmidt et al. | |
| 6,033,452 | A | 3/2000 | Fina et al. | |
| 6,089,698 | A | 7/2000 | Temple et al. | |
| 6,209,541 | B1 * | 4/2001 | Wallace | 128/205.27 |
| 6,290,349 | B1 | 9/2001 | Silverbrook et al. | |
| 6,609,780 | B2 * | 8/2003 | Sugiyama | 347/33 |
| 6,799,844 | B2 * | 10/2004 | Leighton et al. | 347/86 |
| 6,902,246 | B2 * | 6/2005 | Varnon et al. | 347/1 |
| 7,048,365 | B2 * | 5/2006 | Hilton et al. | 347/86 |
| 7,118,206 | B1 * | 10/2006 | Stockwell et al. | 347/92 |
| 2002/0124734 | A1 * | 9/2002 | Spannbauer et al. | 96/380 |
| 2005/0034658 | A1 * | 2/2005 | Palifka et al. | 118/313 |
| 2005/0151798 | A1 * | 7/2005 | Merz et al. | 347/84 |
| 2005/0200655 | A1 | 9/2005 | Macler et al. | |
| 2007/0002107 | A1 * | 1/2007 | Leighton | 347/88 |
| 2007/0125052 | A1 * | 6/2007 | Holzmann et al. | 55/502 |
| 2007/0186520 | A1 * | 8/2007 | Amann | 55/418 |
| 2008/0122901 | A1 * | 5/2008 | Platt et al. | 347/85 |
| 2008/0129808 | A1 * | 6/2008 | Platt et al. | 347/92 |
| 2009/0188217 | A1 * | 7/2009 | Amann | 55/323 |
| 2010/0123762 | A1 * | 5/2010 | Freitag et al. | 347/85 |

* cited by examiner

*Primary Examiner* — Stephen D Meier
*Assistant Examiner* — Leonard S Liang
(74) *Attorney, Agent, or Firm* — Maginot, Moore & Beck LLP

(57) ABSTRACT

An air filter is configured for incorporation in a solid ink umbilical interface to a printhead. The air filter includes a housing having a first component and a second component that mate to one another to form the housing with an internal cavity, the housing having an air inlet and an air outlet, an air filter media positioned within the housing to divide the internal cavity; and at least one retention tab extending from the housing to engage an ink umbilical connector housing at a position that locates the air outlet of the air filter proximate an ink nozzle array extending from the ink umbilical connector.

20 Claims, 6 Drawing Sheets

AIR FILTER FOR USE WITH A LIQUID INK UMBILICAL INTERFACE IN A PRINTER

TECHNICAL FIELD

This disclosure relates generally to liquid ink printers, and more particularly, to solid ink printers that use an air source to purge ink from the printheads.

BACKGROUND

Solid ink or phase change ink printers conventionally use ink in a solid form, either as pellets or as ink sticks of colored cyan, yellow, magenta and black ink, that are inserted into feed channels through openings to the channels. Each of the openings may be constructed to accept sticks of only one particular configuration. Constructing the feed channel openings in this manner helps reduce the risk of an ink stick having a particular characteristic being inserted into the wrong channel. After the ink sticks are fed into their corresponding feed channels, they are urged by gravity or a mechanical actuator to a heater assembly of the printer. The heater assembly includes a heater that converts electrical energy into heating a melt plate. The melt plate is typically formed from aluminum or other lightweight material in the shape of a plate or an open sided funnel. The heater is proximate to the melt plate to heat the melt plate to a temperature that melts an ink stick coming into contact with the melt plate. The melt plate may be tilted with respect to the solid ink channel so that as the solid ink impinging on the melt plate changes phase, it is directed to drip into the reservoir for that color. The ink stored in the reservoir continues to be heated while awaiting subsequent use.

Each reservoir of colored, liquid ink may be coupled to a print head through at least one manifold pathway. As used herein, liquid ink refers to ink that is in a liquid state, such as melted solid ink or aqueous ink. Melted solid ink refers to ink that is in a solid state at typical room temperatures and that has been heated so it changes to a molten state and remains so when elevated above ambient temperature. The liquid ink is pulled from the reservoir as the printhead demands ink for jetting onto a receiving medium or image drum. The printhead elements, which are typically piezoelectric devices, receive the liquid ink and expel the ink onto an imaging surface as a controller selectively activates the elements with a driving voltage. Specifically, the liquid ink flows from the reservoirs through manifolds to be ejected from microscopic orifices by piezoelectric elements in the print head.

Printers having multiple print heads are known. The print heads in these printers may be arranged so a print head need not traverse the entire width of a page during a printing operation. The print heads may also be arranged so multiple rows may be printed in a single operation. Each print head, however, may need to receive multiple colors of ink in order to print the image portion allotted to the print head.

While independent conduit lines may be used to couple each melted ink reservoir to each of the print heads, such a configuration is very inefficient for routing and retention. Actual distances between the reservoirs and heads are much longer. Also, some conduit lines may be sufficiently long that under some environmental conditions the ink may solidify before it reaches its target print head. Conduits must be flexibly configured and attached to one another to allow relative motion for printer operation and reasonable service access. To address these and other issues, an ink umbilical assembly has been developed. Umbilical assembly refers to a plurality of conduit groupings that are assembled together and may be in association with a heater to maintain the ink in each plurality of conduits at a temperature different than the ambient temperature. The term conduit refers to a body having a passageway through it for the transport of a liquid or a gas. The umbilical assembly is flexible enough to enable relative movement between adjacent print heads and between print heads and reservoirs.

A set of conduits may be comprised of independent conduits that are coupled together at each end of the conduits so the conduits are generally parallel to one another along the length of the ink umbilical. Alternatively, the conduits may be extruded in a single structure. A heater may be positioned adjacent to the ink umbilical to transfer heat into the conduits of the umbilical. All of the outlet ends of a set of conduits may be coupled to the same print head. Each conduit in each set of conduits is coupled at an inlet end to an ink source or reservoir and at an outlet end to a print head. Thus, the ink conduit lines remain grouped up to the point where they connect to a printhead to help maintain thermal efficiency. Each conduit may carry ink of a different color. As used herein, coupling refers to both direct and indirect connections between components.

A block diagram for an umbilical system that couples four melted ink reservoirs to four printheads in a solid ink printer is shown in FIG. 7. The system 10 includes reservoirs 14A, 14B, 14C, and 14D that are coupled to print heads 18A, 18B, 18C, and 18D through staging areas 16$A_{1-4}$, 16$B_{1-4}$, 16$C_{1-4}$, and 16$D_{1-4}$, respectively. Each reservoir collects melted ink for a single color. As shown in FIG. 4, reservoir 14A contains cyan colored ink, reservoir 14B contains magenta colored ink, reservoir 14C contains yellow colored ink, and reservoir 14D contains black colored ink. FIG. 4 shows that each reservoir is coupled to each of the print heads to deliver the colored ink stored in each reservoir. Consequently, each print head receives each of the four colors: black, cyan, magenta, and yellow, although other colors may be used for other types of color printers. The melted ink is held in the high pressure staging areas where it resides until a print head requests additional ink. The spatial relationship between reservoirs and print heads are shown in close proximity in the schematic such that the run length of parallel grouping is not illustrated.

From time to time and for various reasons, ink needs to be removed from a printhead. To accomplish this task, an air source may be coupled to a printhead to push air into the ink passageways within the printhead and expel ink through the nozzles for collection in a drip pan or the like. Because the passageways in the printhead are small, the air needs to be filtered to remove debris and dust from the air that may be sufficient to block or partially block an ink passageway in the printhead. In previously known printheads, the filter was located within the printhead. Sometimes, printheads are overfilled with ink and the ink backs up to a position that wets the filter media within the printhead. Unfortunately, this wetting degrades the ability to pressurize the printhead for purging as well as the air venting for the printhead. The impaired air filter cannot be remedied without replacing the entire printhead. Consequently, a more easily serviced air filter would be useful for printhead maintenance.

SUMMARY

An external air filter has been developed that is more easily serviced and can be integrated into a solid ink umbilical interface. The air filter for the solid ink umbilical interface includes a housing having a first component and a second component that mate to one another to form the housing with an internal cavity, the housing having an air inlet and an air outlet, an air filter media positioned within the housing to divide the internal cavity; and at least one retention tab extending from the housing to engage an ink umbilical connector housing at a position that locates the air outlet of the air filter proximate an ink nozzle array extending from the ink umbilical connector.

The air filter may be incorporated into a solid ink umbilical interface. The solid ink umbilical interface includes a solid ink umbilical connector having a plurality of conduits terminating within the connector and a tapered nozzle extending from each conduit in the plurality of conduits, each conduit communicating with a melted ink reservoir, an air filter having an air outlet proximate the plurality of tapered nozzles, the air filter having an air inlet configured to be coupled to an air source, a backplate of a printhead having a plurality of openings, each opening being positioned to receive one of the tapered nozzles extending from the plurality of conduits or the air filter outlet proximate the plurality of tapered nozzles, and at least one sealing member positioned between the backplate and the solid ink umbilical connector, the sealing member having at least one opening to align with one of the backplate openings and receive either a tapered nozzle extending from a conduit or the air nozzle.

The solid ink umbilical interface having an air filter may be incorporated in a solid ink printer. The solid ink printer includes a printhead having a backplate with a plurality of openings, a plurality of liquid ink reservoirs, each reservoir having an outlet, a solid ink umbilical connector having a plurality of conduits, each conduit having a first end and a second end, the first end of each conduit being connected to the outlet of one liquid ink reservoir in the plurality of melted ink reservoirs and the second end of each conduit having a tapered nozzle extending from the second end of the conduit past the solid ink umbilical connector, an air filter enclosed within a housing that is selectively mountable to an external surface of the solid ink umbilical connector, the housing having an air outlet proximate the plurality of tapered nozzles and an air inlet configured to be coupled to an air source, and at least one sealing member positioned between the printhead backplate and the solid ink umbilical connector, the sealing member having at least one opening to align with one of the backplate openings and receive one of either the tapered nozzles extending from the solid ink umbilical connector or the air filter outlet to enable engagement of the tapered nozzles and the air filter outlet with the backplate openings.

BRIEF DESCRIPTION OF THE DRAWINGS

The foregoing aspects and other features of a solid ink umbilical interface are explained in the following description, taken in connection with the accompanying drawings.

DETAILED DESCRIPTION

Figure 1:
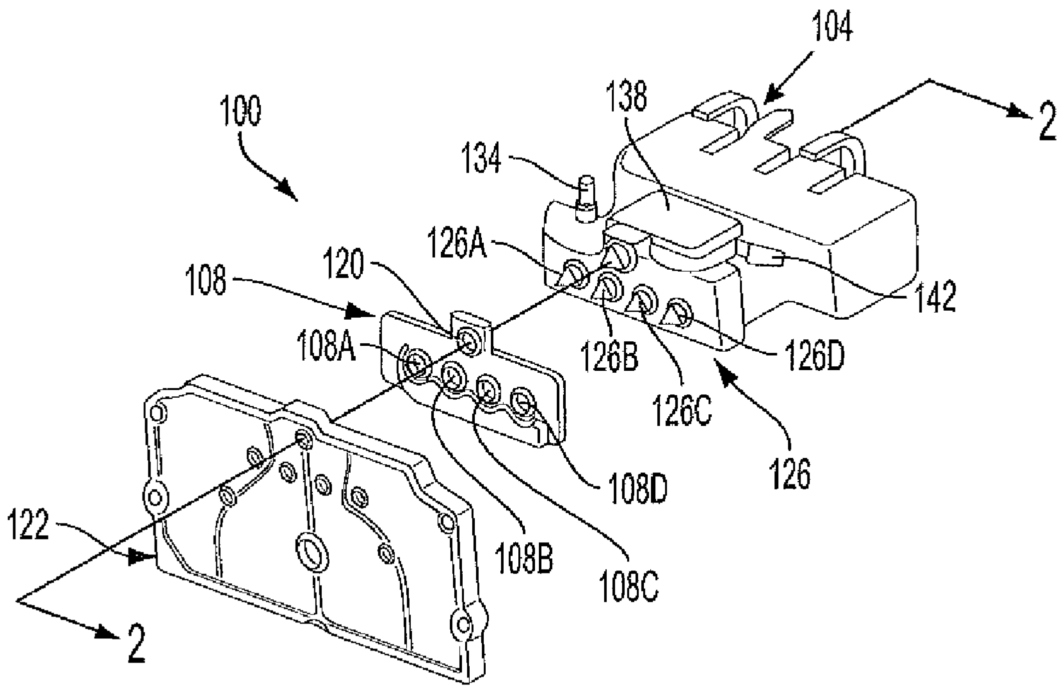
FIG. 1 is an exploded view of a solid ink umbilical interface for used in a solid ink printer.

A solid ink umbilical interface 100 is shown in FIG. 1. The interface 100 includes an umbilical connector 104, a gasket 108, and a printhead backplate 122. The backplate 122 mounts to a rear surface of a solid ink printhead that receives melted ink after the ink has been pushed through an umbilical (not shown) so the melted ink exits from the nozzle array 126 and enters the printhead. The umbilical is similar to the one described above with reference to FIG. 3 as it is configured to have four conduits and each conduit contains a different color of melted ink. Each conduit has a terminating end that is coupled to one of the nozzles in the array 126. The structure of the nozzles 126A, 126B, 126C, and 126D is discussed in more detail below.

The gasket 108 is made of an elastomeric material, such as silicone rubber that has been compression molded, although other materials and construction methods may be used. The gasket 108 includes a number of openings 108A, 108B, 108C, and 108D that corresponds to the number of nozzles in the nozzle array 126. Additionally, the gasket may include an opening that receives a nozzle 134 that is coupled to an air source (not shown). Although the nozzle 134 is shown as being placed within an exit port for an air filter 138, the air filter may be located elsewhere and a conduit carrying the air to the nozzle 134 may be coupled to the nozzle 134 rather than to the inlet 142 of the air filter 138. The gasket 108 may be mounted to the backplate 122 with an adhesive. Screws, spring clamps, or other retentions or fasteners enable the umbilical connector 104 to be coupled to the backplate 122 in a manner that compresses the gasket between them. Compression of the gasket 108 helps seal the openings 108A, 108B, 108C, and 108D through which the nozzles 126A, 126B, 126C, and 126D extend as well as the opening 120 through which nozzle 134 extends.

Figure 2A:
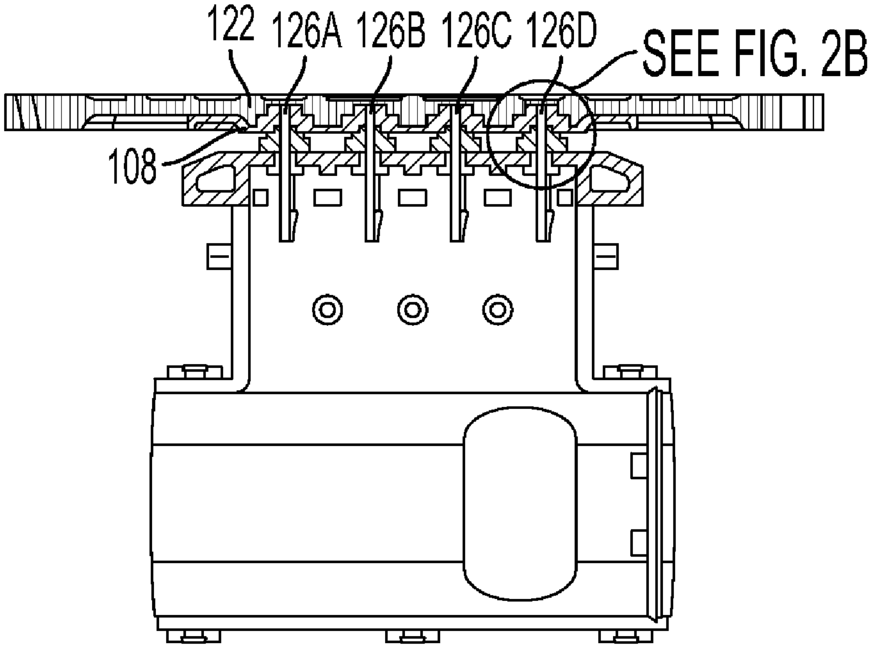
FIG. 2A is a cross-sectional view of the components of the solid ink umbilical interface when the interface is assembled.
Figure 2B:
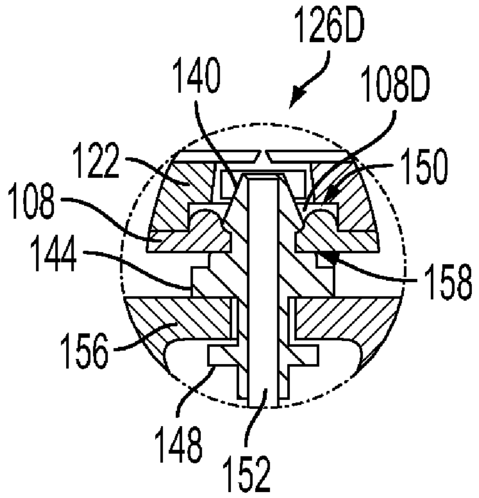
FIG. 2B is a detailed view of the mating of the components of the solid ink umbilical interface at one of the conduit nozzles in the interface shown in FIG. 2.

The structure of the nozzles 126A, 126B, 126C, and 126D are discussed in more detail with reference to FIG. 2A and FIG. 2B. In FIG. 2A, a cross-section of an assembled umbilical interface taken along line 2-2 in FIG. 1 is depicted. As shown in the figure, the gasket 108 is compressed by the nozzles 126A, 126B, 126C, and 126D as the connector 104 is urged towards the backplate 122 by fasteners (not shown). The structure of individual nozzle 126D is shown in FIG. 2B. A nozzle includes a tapered head 140, a rim 144, and a capture ring 148. Defined within the nozzle is a channel 152. The rim 144 and the capture ring 148 cooperate to secure the nozzle to a faceplate 156 of the connector 104. In fabrication, the connector 104 has an upper and a lower portion. Each nozzle is positioned in an opening in the lower portion so the rim 144 is on the external surface of the faceplate and the capture ring 148 is on the internal surface of the faceplate. The upper portion is then mated onto the lower portion to capture the nozzle in the opening and the two portions are secured to one another. The nozzle may be made of a metal, such as aluminum, that conducts heat from the heater element in the umbilical and from the heater elements in the printhead.

As shown in FIG. 2B, the base of the tapered head 140 and the rim 144 have two different circumferences to provide a step between the base of the head and the rim. The base of the head, however, may have the same circumference as the rim to provide smooth continuity between the two structures. Additionally, while the tapered head 140 is depicted as being conical, other sloped surfaces may be used. Also, the nozzle opening 108D in the gasket 108 is shown as having a circular rib 150 about the opening on the side of the gasket that engages the backplate 122. This rib helps fill the corresponding opening 154 in the backplate.

The structure of the nozzle and the gasket described above provide a number of advantages. For one, the tapered head 140 facilitates the release of the nozzle head from solidified ink in a cold printhead. Because the solidified ink does not significantly bond the head 140 to the printhead, the head 140 does not pull solidified ink against the gasket opening or the channel through the gasket opening. In previously known designs, cylindrical nozzles pulled solidified ink adhering to them from the backplate against the sealing structure, such as an O-ring, which sometimes damaged the sealing structure. The tapered heads also provide a greater range of tolerance for fitting into the openings than cylindrical nozzles. Another advantage of a single piece gasket construction is the ease of locating the gasket with the backplate and nozzle array of the interface with an improvement in the sealing of the channels around the nozzles. A single piece gasket and the proximate location of the air source nozzle to the ink nozzle array may enable both a melted ink source and a purging air source to be coupled to a printhead through the same interface.

Figure 3:
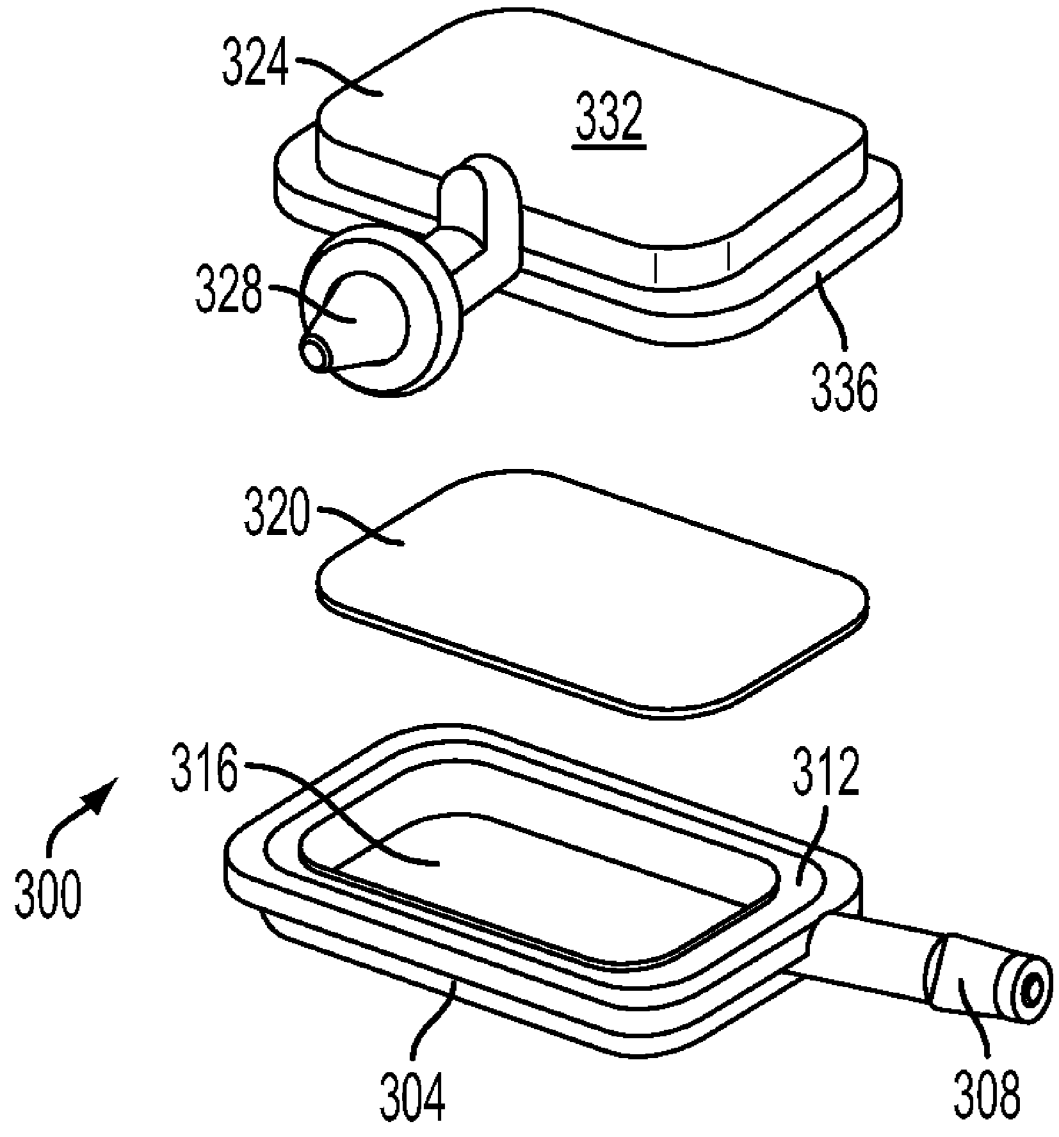
FIG. 3 is an exploded view of an air filter housing and filter media for the interface of FIG. 1.

FIG. 3 depicts an air filter that may be incorporated in the ink umbilical interface with a printhead. The air filter 300 includes a bottom housing component 304 having an air inlet 308. Air inlet 308 is configured for mating with an air conduit that is coupled at another end to an air source. The air source provides a flow of air that enters a printhead after passing through the air filter for purging the printhead. The bottom housing component 304 also includes a flange 312 around the internal periphery of an internal cavity 316 in the housing component 304. The flange 312 forms a support surface for filter media 320 to enable the filter media to be placed in the bottom housing component 304 and form a barrier to the internal cavity 316. Top housing component 324 includes an air outlet 328. Top housing 324 also has an internal cavity underneath the upper surface 332 that has a flange 336 that complements the flange 312. In assembly of the air filter 300, the top housing 324 is placed over the bottom housing 304 so the air filter media 320 is trapped between the flanges 312 and 336. The top and bottom housings are then ultrasonically welded to maintain the filter media at a position in the housing that enables filtering of the air that enters the filter 300 from the inlet 308. The filtered air then exits the filter 300 at the outlet 328. The top and bottom housings may be injection molded parts, metal machined parts, or other similarly manufactured components. The filter media may be metal filter cloth with an absolute rating of about 12 to about 14 microns, although metal felt or other materials with appropriately sized openings may be used. The filter output may extend as a protruding passage or tube from the air filter housing to accommodate printer configurations that benefit from remotely locating the air filter from the umbilical interface. The air filter assembly (housing and filter media) is disposable in preference to a design that enables replacement of the filter media as replacement of the media may lead to the introduction of debris and/or containments to the printhead.

Figure 4A:
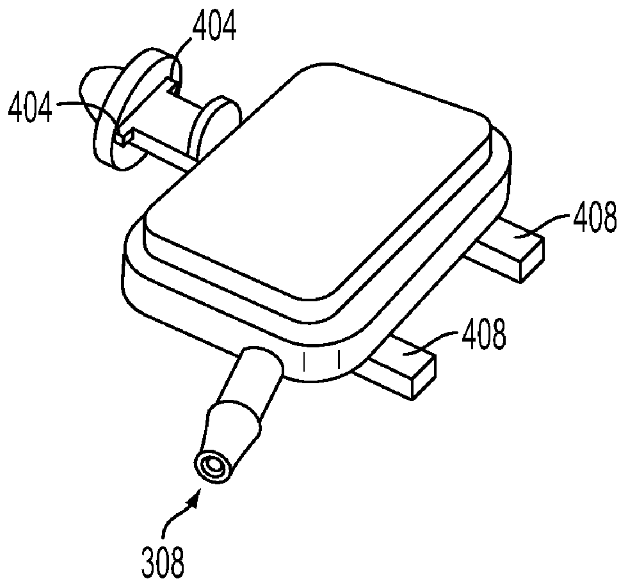
FIG. 4A is a top perspective view of the air filter of FIG. 3 depicting the rear retention tabs and collar retention tabs of the air filter housing.
Figure 4B:
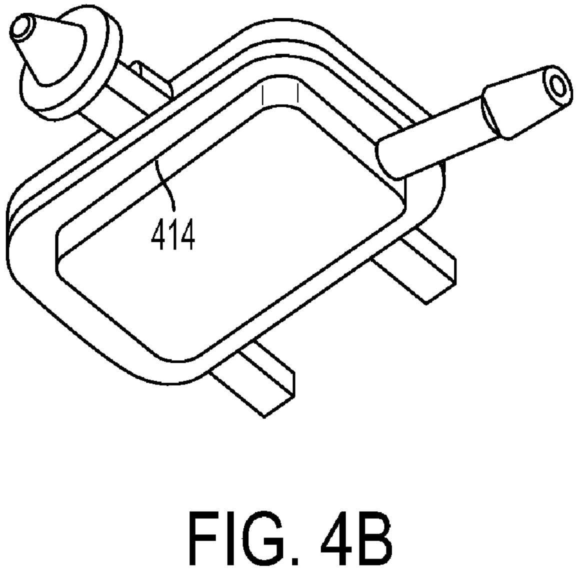
FIG. 4B is a bottom perspective view of the air filter of FIG. 3 illustrating the snap retention face of the lower air filter housing and the tapered nozzle of the air filter outlet.

As shown in FIG. 4A, two retention tabs 404 are mounted on opposing sides of air outlet 328. These tabs interact with the ink umbilical connector as described below to secure the air outlet to the connector housing. Also shown in FIG. 4A are retention tabs 408 that extend from bottom housing 304. These retention tabs also interact with the ink umbilical connector housing to secure the air filter 300 to the connector. FIG. 4B shows a snap retention face that engages structure on the ink umbilical connector as described below to help secure the air filter to the connector.

Figure 5:
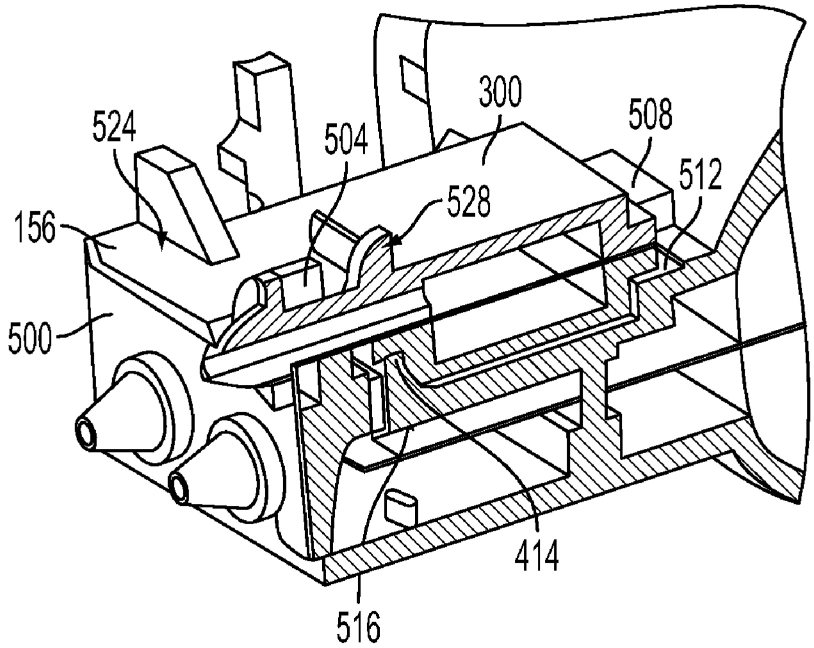
FIG. 5 is a cut away side view of the air filter housing mounted in an ink umbilical connector that illustrates the engagement of the retention tabs with the ink umbilical connector.

FIG. 5 shows the cut away side view of the air filter 300 mounted to an ink umbilical connector 500. A gripping arm 504 is shown as overlaying retention tabs 404 on the air outlet 328. In a similar manner, another gripping arm also overlays the other retention tab 404 on the opposite side of the outlet 328. One of the retention tabs 408 is also shown as being held between mounting tab 508 and surface 512 of the connector 500. The other retention tab 408 is held in a similar manner by another mounting tab 508 on the portion of the connector housing not depicted in the cut away view of FIG. 5. The snap retention face 414 engages a mounting tab 516 that extends from surface 512. The interaction of the retention tabs 404, 408, and 414 with the mounting tabs 504, 508, and 516 as well as surface 512 secure the air filter 300 to the ink umbilical connector 500 without requiring the use of fasteners or other mounting hardware that necessitate the use of tools for mounting and dismounting of the air filter. Additionally, the ink umbilical connector may include a receptacle 524 at each end of the faceplate 156 of the connector 500 and top housing 324 may also include resting tab 528 on the air outlet 328. The receptacles 524 and the tab 528 may be used to interact with a wire spring to secure the air filter to the connector 500 as is now explained.

Figure 6:
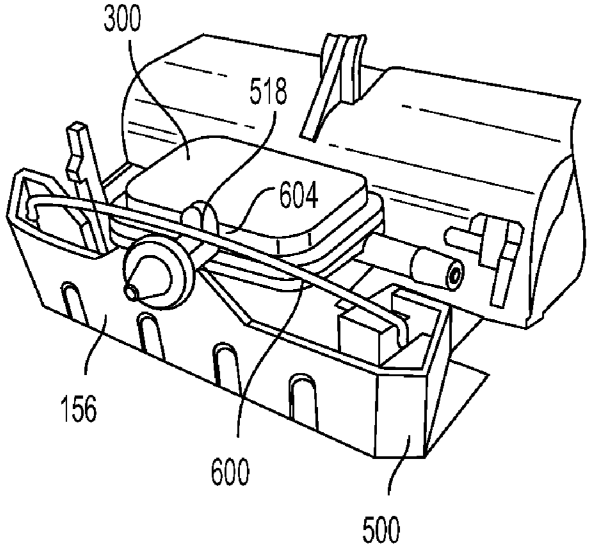
FIG. 6 is a front perspective view of the air filter mounted to the ink umbilical connector depicting a wire spring used to urge the air outlet in the retaining collars of the connector.
Figure 7:
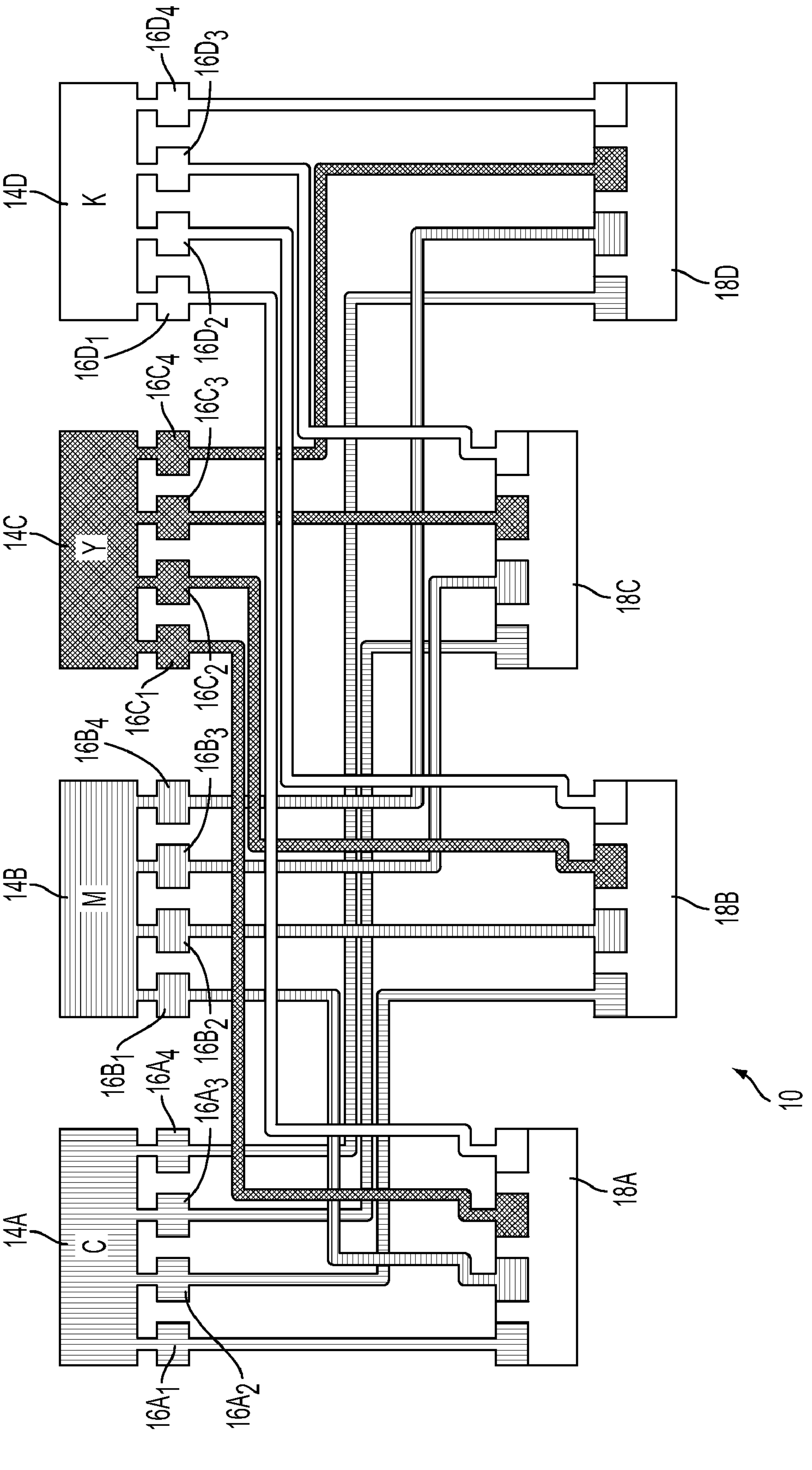
FIG. 7 PRIOR ART
FIG. 7 is a block diagram of connections for a prior art ink delivery system in a solid ink printer.

As shown in FIG. 6, the air filter 300 has been mounted to an ink umbilical connector 500 using the retention tabs and connector structure as discussed above with reference to FIG. 5. Additionally, a wire spring 600 has been incorporated in the connector 500 to urge the air outlet against the connector 500. The wire spring may be formed with a L-shaped leg at each end and a straight section 604 connecting the two legs to one another. Each L-shaped leg is captured within one of the receptacles 524 in the faceplate 156. The straight section 604 is slightly bent by the tab 528 as it traverses the distance between the L-shaped legs. This bend causes the wire to urge the air outlet against the connector 500. This force is especially useful when pressurized air is flowing through the outlet to the printhead. Although the wire spring has been described as having L-shaped legs at each end, other wire configurations may be used to install a biasing member into the ink umbilical connector and urge the air outlet against the umbilical connector.

In operation, each conduit of a melted ink umbilical is coupled to an ink nozzle in the ink umbilical connector. An air filter is secured to the ink umbilical connector by inserting the rear tabs into the connector housing structure and pushing the filter housing downward towards the connector surface so the snap retention face engages the tabs on the connector and the air outlet spreads the gripping arms until the outlet has passed through the arms and the arms grip the tabs on the air outlet. A wire spring may then have one end inserted into a receptacle on the connector faceplate and then the wire is rotated downwardly until the mid-section of the straight wire section encounters the tab on the air outlet and the free end of the wire spring is secured in the other receptacle of the connector faceplate. The gasket is mounted to the backplate with an adhesive or the like. The umbilical connector is then mounted to the backplate to enable each ink nozzle and air filter outlet nozzle to enter the corresponding opening for the nozzle in the gasket. As the fasteners are tightened, the gasket provides a radial and face seal for each nozzle so purging air and melted ink may be supplied to the printhead. Thereafter, the fasteners mounting the connector to the backplate may be loosened and the connector pulled away from the printhead. Even though the ink within the printhead has solidified, the tapered heads enable the nozzles to disengage from the solidified ink and exit the gasket without significant risk that the solidified ink adheres to the nozzle and be pulled through the gasket. In the event that ink has overflowed into the air filter, the wire spring may be removed, the air filter lifted out of the mounting tabs, and the rear retention tabs withdrawn from the umbilical connector. Another filter may then be installed as described above. Thus, the air filter may be replaced without having to disengage the printhead from the ink umbilical connector.

It will be appreciated that various above-disclosed and other features and functions, or alternatives thereof, may be desirably combined into many other different systems or applications. Various presently unforeseen or unanticipated alternatives, modifications, variations, or improvements therein may be subsequently made therein by those skilled which are also intended to be encompassed by the following claims.

What is claimed is:

1. An air filter for a solid ink umbilical interface that couples an ink umbilical to a printhead comprising:
- a housing having a first component and a second component that mate to one another to form the housing with an internal cavity, the housing having an air inlet and an air outlet;
- an air filter media positioned within the housing to divide the internal cavity; and
- at least one retention tab extending from the housing to engage an ink umbilical connector housing at a position that locates the air outlet of the air filter proximate an ink nozzle array extending from the ink umbilical connector.

2. The air filter of claim 1 wherein the first and the second housing components are injection molded components.

3. The air filter of claim 1 wherein the first and the second housing components are ultrasonically welded to one another.

4. The air filter of claim 1, one of the first and the second housing components further comprising:
- a face that engages a mounting tab extending from a surface of the ink umbilical connector.

5. The air filter of claim 1, the air outlet further comprising:
- at least one retention tab that is engaged by a gripping arm on the ink umbilical connector housing to secure the air outlet to the ink umbilical connector housing.

6. The air filter of claim 1 wherein the at least one retention tab is configured for capture between a mounting tab extending from the ink umbilical connector housing and a surface of the ink umbilical connector housing.

7. A solid ink umbilical interface for coupling an ink umbilical to a printhead comprising:
- a solid ink umbilical connector having a plurality of conduits terminating within the connector and a tapered nozzle extending from each conduit in the plurality of conduits, each conduit communicating with a melted ink reservoir;
- an air filter having an air outlet proximate the plurality of tapered nozzles, the air filter having an air inlet configured to be coupled to an air source;
- a backplate of a printhead having a plurality of openings, each opening being positioned to receive one of the tapered nozzles extending from the plurality of conduits or the air filter outlet proximate the plurality of tapered nozzles; and
- at least one sealing member positioned between the backplate and the solid ink umbilical connector, the sealing member having at least one opening to align with one of the backplate openings and receive either a tapered nozzle extending from a conduit or the air nozzle.

8. The solid ink umbilical interface of claim 7, the air filter further comprising:
- a housing having a first component and a second component that mate to one another to form the housing with an internal cavity, the housing having an air inlet and an air outlet;
- an air filter media positioned within the housing to divide the internal cavity; and
- at least one retention tab extending from the housing to engage an ink umbilical connector housing at a position that locates the air outlet of the air filter proximate an ink nozzle array extending from the ink umbilical connector.

9. The solid ink umbilical interface of claim 8 wherein the first and the second housing air filter components are injection molded components.

10. The solid ink umbilical interface of claim 8 wherein the first and the second air filter housing components are ultrasonically welded to one another.

11. The solid ink umbilical interface of claim 8, one of the first and the second air filter housing components further comprising:
- a face that engages a mounting tab extending from a surface of the ink umbilical connector.

12. The solid ink umbilical interface of claim 8, the air filter outlet further comprising:
- at least one retention tab that is engaged by a gripping arm on the ink umbilical connector to secure the air outlet to the ink umbilical connector.

13. The solid ink umbilical interface of claim 8 wherein the at least one retention tab is configured for capture between a mounting tab extending from the ink umbilical connector and a surface of the ink umbilical connector.

14. The solid ink umbilical interface of claim 8, each tapered nozzle includes:
- a cylindrical inlet configured to be received within a conduit terminating within the solid ink umbilical connector;
- a rim positioned about the cylindrical inlet at a predetermined distance from one end of the cylindrical inlet; and
- a conical nozzle extending from the rim.

15. The solid ink umbilical interface of claim 14, each tapered nozzle further comprising:
- a collar separated from the rim by a second predetermined distance, the second predetermined distance corresponding to a thickness for a faceplate of the solid ink umbilical connector.

16. The solid ink umbilical interface of claim 15 wherein the sealing member is a gasket having a plurality of openings, each opening in the gasket being positioned to align with one of the openings in the backplate and to receive either one of the tapered nozzles extending from the plurality of conduits or the air filter outlet.

17. The solid ink umbilical interface of claim 16 wherein the gasket is made of an elastomer.

18. The solid ink umbilical interface of claim 16 wherein the air filter outlet includes a tapered nozzle.

19. A solid ink printer comprising:
- a printhead having a backplate with a plurality of openings;
- a plurality of liquid ink reservoirs, each reservoir having an outlet;
- a solid ink umbilical connector having a plurality of conduits, each conduit having a first end and a second end, the first end of each conduit being connected to the outlet of one liquid ink reservoir in the plurality of melted ink reservoirs and the second end of each conduit having a tapered nozzle extending from the second end of the conduit past the solid ink umbilical connector;

an air filter enclosed within a housing that is selectively mountable to an external surface of the solid ink umbilical connector, the housing having an air outlet proximate the plurality of tapered nozzles and an air inlet configured to be coupled to an air source; and at least one sealing member positioned between the printhead backplate and the solid ink umbilical connector, the sealing member having at least one opening to align with one of the backplate openings and receive one of either the tapered nozzles extending from the solid ink umbilical connector or the air filter outlet to enable engagement of the tapered nozzles and the air filter outlet with the backplate openings.

20. The solid ink printer of claim 19, the housing of the air filter further comprising:

at least one retention tab extending from the housing, the at least one retention tab being configured to engage the ink umbilical connector selectively to enable removal of the air filter housing from the ink umbilical connector without disengaging any of the tapered nozzles from the printhead backplate.

* * * * *